United States Patent
Crigler et al.

(10) Patent No.: US 9,982,434 B1
(45) Date of Patent: May 29, 2018

(54) ENCAPSULATED ANCHOR DEVICES, SYSTEMS, AND METHODS

(71) Applicant: Structural Technologies IP, LLC, Columbia, MD (US)

(72) Inventors: John R. Crigler, Woodbine, MD (US); Gregory A. Hunsicker, Dallas, TX (US)

(73) Assignee: Structural Technologies IP, LLC, Hanover, MD (US)

( * ) Notice: Subject to any disclaimer, the term of this patent is extended or adjusted under 35 U.S.C. 154(b) by 0 days. days.

(21) Appl. No.: 15/172,344

(22) Filed: Jun. 3, 2016

Related U.S. Application Data

(60) Provisional application No. 62/170,797, filed on Jun. 4, 2015.

(51) Int. Cl.
*E04C 5/12* (2006.01)
*F16M 13/02* (2006.01)

(52) U.S. Cl.
CPC .............. *E04C 5/12* (2013.01); *F16M 13/02* (2013.01)

(58) Field of Classification Search
CPC ....................................................... E04C 5/12
See application file for complete search history.

(56) References Cited

U.S. PATENT DOCUMENTS

| | | | | |
|---|---|---|---|---|
| 4,348,844 A | * | 9/1982 | Schupack | E04C 5/12 52/223.13 |
| 4,719,658 A | * | 1/1988 | Kriofske | E04C 5/122 52/223.13 |
| 4,821,474 A | * | 4/1989 | Rodriguez | E04C 5/12 24/122.6 |
| 4,896,470 A | * | 1/1990 | Sorkin | E04C 5/12 52/223.13 |
| 4,918,887 A | * | 4/1990 | Davis | E04C 5/122 52/223.13 |
| 5,024,032 A | * | 6/1991 | Rodriguez | E04C 5/12 24/122.6 |
| 5,072,558 A | * | 12/1991 | Sorkin | E04C 5/12 52/223.13 |
| 5,079,879 A | * | 1/1992 | Rodriguez | E04C 5/12 24/122.6 |
| 5,271,199 A | * | 12/1993 | Northern | E04C 5/12 24/122.6 |
| 5,347,777 A | * | 9/1994 | Sudduth | E04C 5/122 52/223.13 |
| 5,440,842 A | * | 8/1995 | Sorkin | E04C 5/12 52/223.13 |
| 5,596,854 A | * | 1/1997 | Crigler | E04C 5/122 405/259.1 |
| 5,749,185 A | * | 5/1998 | Sorkin | E04C 5/12 24/122.6 |

(Continued)

*Primary Examiner* — Rodney Mintz
(74) *Attorney, Agent, or Firm* — Jenkins, Wilson, Taylor & Hunt, P.A.

(57) ABSTRACT

Encapsulated anchor devices, systems, and methods are provided. An exemplary anchor device is used in a system for reinforcing a structure. The exemplary anchor device includes an anchor plate and a wedge. A strand is pulled through the anchor plate, and one portion of the strand is disposed in a first cover and another portion of the strand is bare. The device further includes a protective cover that encapsulates the anchor plate, the strand, and a portion of the first cover.

19 Claims, 6 Drawing Sheets

(56) References Cited

U.S. PATENT DOCUMENTS

| | | | | |
|---|---|---|---|---|
| 5,755,065 A * | 5/1998 | Sorkin | E04C 5/12 52/223.13 |
| 5,770,286 A * | 6/1998 | Sorkin | E04C 5/08 138/96 R |
| 5,788,398 A * | 8/1998 | Sorkin | E04C 5/12 285/138.1 |
| 5,839,235 A * | 11/1998 | Sorkin | E04C 5/10 24/122.6 |
| 5,939,003 A * | 8/1999 | Crigler | E04C 5/10 264/228 |
| 6,023,894 A * | 2/2000 | Sorkin | E04C 5/122 24/122.6 |
| 6,027,278 A * | 2/2000 | Sorkin | E04C 5/122 403/371 |
| 6,234,709 B1 * | 5/2001 | Sorkin | E04C 5/122 403/371 |
| 6,354,596 B1 * | 3/2002 | Rodriguez | E04C 5/12 174/153 G |
| 6,380,508 B1 * | 4/2002 | Sorkin | B23K 7/10 219/121.39 |
| 6,381,912 B1 * | 5/2002 | Sorkin | E04C 5/08 24/459 |
| 6,610,399 B1 * | 8/2003 | Crigler | E01D 19/16 138/124 |
| 6,631,596 B1 * | 10/2003 | Sorkin | E04C 5/12 24/122.6 |
| 6,761,002 B1 * | 7/2004 | Sorkin | E04C 5/12 403/374.1 |
| 6,817,148 B1 * | 11/2004 | Sorkin | E04C 5/12 24/122.6 |
| 6,843,031 B1 * | 1/2005 | Sorkin | E04C 5/08 285/285.1 |
| 7,424,792 B1 * | 9/2008 | Sorkin | E04C 5/122 52/223.13 |
| 7,676,997 B1 * | 3/2010 | Sorkin | E04C 5/12 52/223.13 |
| 7,797,894 B1 * | 9/2010 | Sorkin | E04C 5/122 403/314 |
| 7,797,895 B1 * | 9/2010 | Sorkin | E04C 5/122 403/314 |
| 7,823,345 B1 * | 11/2010 | Sorkin | E04C 5/122 24/122.3 |
| 7,841,061 B1 * | 11/2010 | Sorkin | E04C 5/122 24/122.3 |
| 7,841,140 B1 * | 11/2010 | Sorkin | E04C 5/10 403/314 |
| 7,856,774 B1 * | 12/2010 | Sorkin | E04C 5/122 24/122.6 |
| 7,866,009 B1 * | 1/2011 | Sorkin | F16G 11/048 24/136 R |
| 7,950,196 B1 * | 5/2011 | Sorkin | E04C 5/10 403/314 |
| 7,950,197 B1 * | 5/2011 | Sorkin | E04C 5/10 403/314 |
| 7,963,078 B1 * | 6/2011 | Sorkin | E04C 5/122 24/122.3 |
| 8,015,774 B1 * | 9/2011 | Sorkin | E04C 5/122 403/368 |
| 8,065,845 B1 * | 11/2011 | Sorkin | E04C 5/122 24/115 M |
| 8,069,624 B1 * | 12/2011 | Sorkin | E04C 5/12 403/314 |
| 8,087,204 B1 * | 1/2012 | Sorkin | E04C 5/08 52/223.13 |
| 9,097,014 B1 * | 8/2015 | Sorkin | E04C 5/122 |
| 2002/0083659 A1 * | 7/2002 | Sorkin | E04C 5/08 52/167.1 |
| 2002/0129570 A1 * | 9/2002 | Sorkin | E04C 5/12 52/223.13 |
| 2004/0148880 A1 * | 8/2004 | Hayes | E04C 5/12 52/223.1 |
| 2004/0148881 A1 * | 8/2004 | Hayes | E04C 5/12 52/223.13 |
| 2004/0148882 A1 * | 8/2004 | Hayes | E04C 5/12 52/223.14 |
| 2006/0179742 A1 * | 8/2006 | Mathews | E04C 5/122 52/223.13 |
| 2009/0077913 A1 * | 3/2009 | Sorkin | E04C 5/10 52/223.13 |
| 2015/0330078 A1 * | 11/2015 | Sorkin | E04B 1/66 52/223.13 |
| 2017/0204607 A1 * | 7/2017 | Schmidt | E04C 5/122 |
| 2017/0275881 A1 * | 9/2017 | Sorkin | E04C 5/12 |
| 2017/0328065 A1 * | 11/2017 | Sorkin | E04C 5/12 |

* cited by examiner

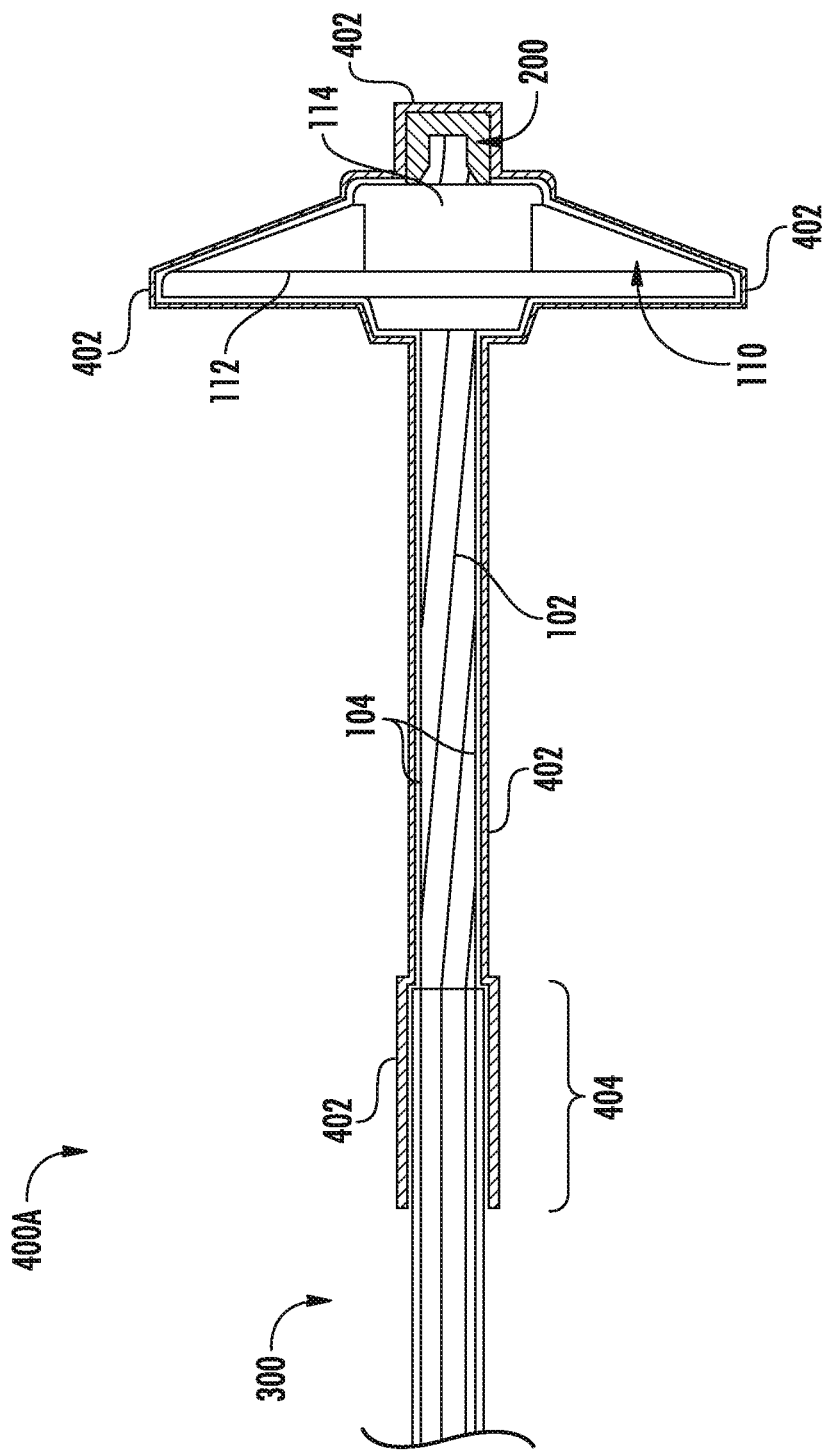

ENCAPSULATED ANCHOR DEVICES, SYSTEMS, AND METHODS

CROSS-REFERENCE TO RELATED APPLICATION

The present application claims priority to U.S. Provisional Patent Application Ser. No. 62/170,797, filed on Jun. 4, 2015, the disclosure of which is incorporated herein by reference in its entirety.

TECHNICAL FIELD

The subject matter herein relates generally to anchor devices, systems and methods. The subject matter herein more particularly relates to encapsulated post-tensioning anchor devices, systems, and methods for reinforcing buildings and/or structures.

BACKGROUND

Since post-tensioning was first used domestically in 1949, the industry has seen many technological advances, including seven-wire, low relaxation strand, improved analysis techniques and design software, extruded sheathing, anchors, and plastic duct systems, as well as the development of pre-packaged, non-bleed grouts. Some of the biggest improvements have been in the area of durability. For example, when some of the earliest un-bonded post-tensioned buildings were about 15 years old, corrosion problems started to surface and it was apparent that some tendon sheathings and coatings could not adequately resist corrosion cause by environmental factors. Improvements in system durability have significantly lengthened the lifespan of post-tensioning systems, which continues to be a major focus in the industry.

Starting in the mid-1970s, the Post-Tensioning Institute (PTI) developed tendon material specifications designed to address the corrosion problems. PTI specified improvements in sheathing, coatings and, in aggressive environments, complete encapsulation of the tendons. Advancements that are more recent have opened new doors for post-tensioning as a long-term, durable design solution.

One method of protecting post-tensioning systems is by encapsulation, which, for un-bonded tendons, evolved into a seamless extruded plastic sheathing around individual steel strands. While this technique protected the tendons along their length, it did not address protection of the anchors.

In the late 1980s, the first generation of encapsulated anchors was introduced. Although this technology allowed for great advancement in durability, it did not completely address encapsulation at construction joints. Later generation anchors offer end-to-end protection of the tendon. Such "end-to-end" protection, however, utilizes removable grease filled end caps disposed about the tail (end) portions of the strand for protection. It is common for the caps to detach and fall off during transportation of the anchors from the manufacturer to the jobsite. There is also the case where the caps are improperly installed in the field. This is problematic, as the ends of the strand can become exposed, and un-encapsulated. Thus, corrosion problems may still exist, especially in the most susceptible areas.

In view of these problems, improved encapsulated anchor devices, systems, and methods are needed.

SUMMARY

In accordance with this disclosure, novel encapsulated anchor devices, systems, and methods are provided. An exemplary anchor device is used in a system for reinforcing a structure. The exemplary anchor device includes an anchor plate and a wedge. A strand is pulled through the anchor plate, and one portion of the strand is disposed in a first cover and another portion of the strand is bare. The device further includes a protective cover that encapsulates the anchor plate, the strand, and a portion of the first cover.

An exemplary anchor system includes an anchor plate, a strand disposed in a portion of the anchor plate, and a protective cover. A first portion of the strand is disposed on a first side of the anchor plate and a second portion of the strand is disposed on a second side of the anchor plate. The first portion of the strand is in a first cover and the second portion is devoid of the first cover. The protective cover is disposed over the second portion of the strand and the anchor plate for improved resistance to corrosion.

In some embodiments, an exemplary method of providing a fixed end anchor is provided. The method includes providing an anchor plate, providing a strand, extruding a first cover over the strand, stripping a portion of the first cover from an end of the strand, and pulling the strand through the anchor plate. The strand is secured within the anchor plate via a wedge. The method further includes encapsulating the anchor plate, the end of the strand, and portions of the first cover with a protective cover. In some embodiments, an end cap is disposed between portions of the strand and the protective cover. The end cap is also referred to as a "centering device" as it centers the strand and anchor components during application of the protective cover.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures (FIGS.) in which:

FIGS. 4A and 4B illustrate embodiments of a fully encapsulated anchor system according to some aspects.

DETAILED DESCRIPTION

Figure 1A:
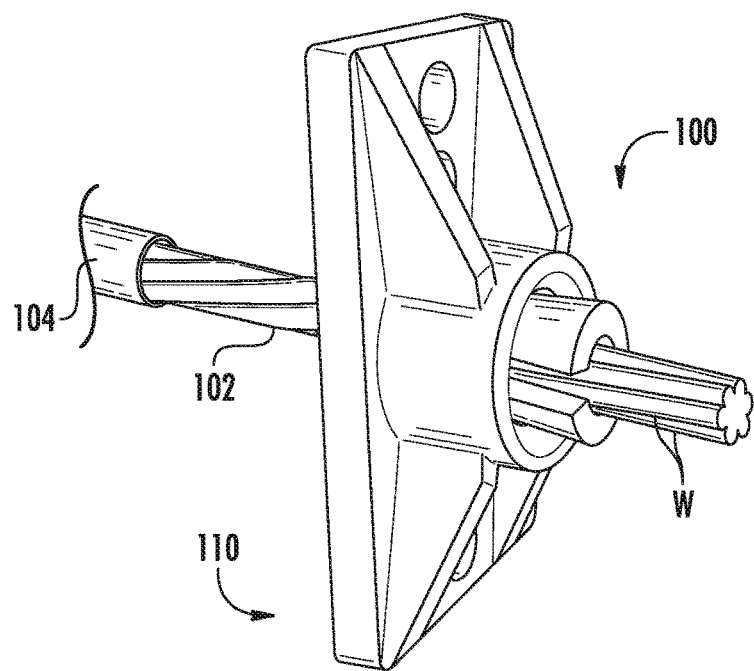
FIG. 1A is a perspective view of an anchor system including an anchor device according to some aspects.

Figures (also "FIGS.") 1A through 5 illustrate various views, embodiments, and/or aspects associated with encapsulated anchor devices, systems, and methods.

In some embodiments, anchor devices, systems, and related methods described herein can be fully encapsulated and/or fully coated with a protective material thereby providing a single, integrated system or component, which obviates the need for end caps that are prone to becoming displaced and/or detached during transportation and/or installation on a jobsite.

The protective material used to encapsulate or coat the anchor system or device may include a non-metallic material, and optionally a corrosion resistant material, a polymeric material, plastic, combinations thereof, or the like. A fully encapsulated system is more resistant to corrosion and/or degradation during its operable life. The protective material may extend over portions of the strand (e.g., both the sheathed and unsheathed portions), the anchor plate, and the wedge. The protective material can be a protective layer that is different from the strand sheathing, and may extend over and cover portions of the strand sheathing.

Fully encapsulated anchor devices, systems, and related methods provide for a single, integrated anchor system that is devoid of detachable and/or removable parts (e.g., which are susceptible to falling off and/or becoming detached).

In some embodiments, devices, systems, and methods herein advantageously utilize pull-seating of a strand and a wedge onto, through, and/or within an anchor plate, which allows for easier assembly, faster assembly, and improved quality of the respective anchor system, as the strand is stress-tested during seating.

As used herein, the term "pull-seating" refers to the seating of a wedge and a strand at a fixed-end anchor plate, and includes stripping the sheathing from portions of the strand to permit the stressing tool (e.g., jack) to pull the wedge and strand into the anchor cavity.

Unless otherwise defined, terms used herein should be construed to have the same meaning as commonly understood by one of ordinary skill in the art to which this subject matter belongs. It will be further understood that terms used herein should be interpreted as having a meaning that is consistent with the respective meaning in the context of this specification and the relevant art, and should not be interpreted in an idealized or overly formal sense unless expressly so defined herein.

Aspects of the subject matter are described herein with reference to sectional, perspective, elevation, and/or plan view illustrations that are schematic illustrations of idealized aspects of the subject matter. Variations from the shapes of the illustrations as a result, for example, of manufacturing techniques and/or tolerances, are to be expected, such that aspects of the subject matter should not be construed as limited to particular shapes illustrated herein. This subject matter can be embodied in different forms and should not be construed as limited to the specific aspects or embodiments set forth herein. In the drawings, the size and relative sizes of layers and regions can be exaggerated for clarity.

Unless the absence of one or more elements is specifically recited, the terms "comprising," "including," and "having" as used herein should be interpreted as open-ended terms that do not preclude the presence of one or more elements. Like numbers refer to like elements throughout this description.

It will be understood that when an element such as a layer, region, or substrate is referred to as being "on" another element, it can be directly on the other element or intervening elements can be present. Moreover, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the object in addition to the orientation depicted in the figures. For example, if the object in the figures is turned over, structure or portion described as "above" other structures or portions would now be oriented "below" the other structures or portions.

Referring to FIGS. 1A through 5, several non-limiting, exemplary embodiments of encapsulated anchor devices, systems, or portions thereof and related methods are illustrated. As each of the figures is exemplary, some elements and/or the functionality thereof may be combined, separated, integrated, and/or modified while remaining within the scope of the claims.

Figure 1B:
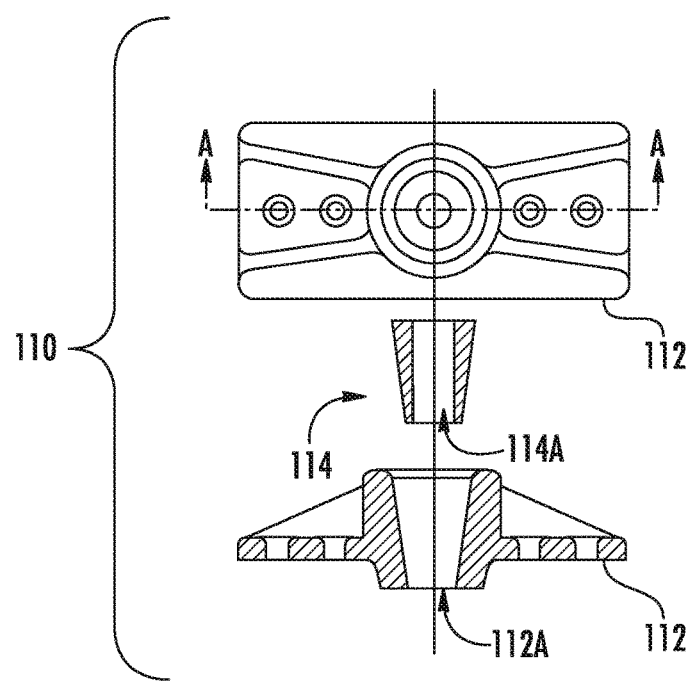
FIG. 1B illustrates an anchor device, or portions thereof, in an exploded views according to some aspects.

FIGS. 1A and 1B illustrate various views of a fixed-end anchor system and device, respectively and generally designated 100 and 110. Anchor system 100 and anchor device 110 can be used to anchor end portions of a strand to form a fixed end (e.g., "dead end") anchor used in the post-tensioning of buildings and/or reinforcing various structures (e.g., bridges, roadways, foundation slabs, beams, or the like). Notably, anchor system 100 can be fully encapsulated and/or fully coated within one or more layers of material, such as one or more protective layers of material. This provides a single, integrated structure and obviates the need for conventional end caps that are prone to becoming displaced and/or detached during transportation and/or installation on a jobsite.

Portions of anchor system 100 (e.g., the tendon (strand), coating, anchors, and wedges), can be encapsulated (coated) and subsequently cast in a concrete slab, block, or beam for reinforcing structures. The encapsulation improves the resistance of anchor system 100 and device 110 to corrosive environments, thereby providing protected, more durable, longer lasting anchor devices 110 and systems.

Referring to FIG. 1A, anchor system 100 comprises a post-tensioning strand 102 (e.g., a monostrand), a portion of which is encapsulated or coated in at least one covering or cover 104 (e.g., a first cover). Cover 104 may include a sheath formed from a plastic material (e.g., a High-Density Polyethylene (HDPE) or polypropylene (PP) that can be extruded about strand 102 for corrosion protection. Strand 102 may include a monostrand formed from a plurality of wires W (e.g., 3 wires, 7 wires, etc.) that are wound, wrapped, braided, twisted, or otherwise bundled together to form a single strand 102. Strand 102 may include a plurality of steel wires that optionally include a galvanized material thereon (e.g., zinc, a powder coating, or the like).

System 100 can further comprise a fixed end anchor element or anchor device 110. Referring to FIG. 1B, anchor device 110 can comprise an anchor plate 112 and a wedge 114. Plate 112 and wedge 114 can comprise any suitable material, such as metal (e.g., iron) or a metal alloy (e.g., a metal comprising iron), and each portion may be individually formed via casting, forging, pressing, or the like.

In some embodiments, plate 112 includes at least one plate aperture, hole, or opening 112A configured to receive strand 102 (FIG. 1A). Wedge 114 also comprises at least one wedge aperture, hole, or opening 114A that is concentric and/or co-axially aligned with respect to plate opening 112A. Plate opening 112A and wedge opening 114A are each configured to receive a portion of strand 102 (FIG. 1A). Strand 102 (FIG. 1A) may be fixedly held within anchor device 110 via wedge 114, for example, when wedge 114 is compressed and/or frictionally engaged with plate opening 112A. In some embodiments, outer (e.g., peripheral) surfaces of wedge 114 are configured to contact and compress against inner surfaces of plate opening 112A. An end of strand 102 (FIG. 1A) may be stripped of cover 104 and pulled through plate opening 112A and wedge opening 114A and secured therein.

In some embodiments, strand 102 (FIG. 1A) is seated within device 110 via a pull-seating process. Pull-seating has a long, proven record of accomplishment regarding reliability and provides the added benefit of having a load test on every fixed end anchor prior to installation. The load test is provided by virtue of stressing or jacking the strand 102

(FIG. 1A) and wedge 114 with respect to the plate 112. Weak strands may fail and/or wedges may slip during pull-seating, while robust strands and/or wedges will not fail (i.e., and pass the inherent stress test). This provides an added level of quality to assure that the wedge 114 of devices 110 will not slip out once placed in concrete. Moreover, repair of pullouts (e.g., anchors in which the wedge slips) is a costly operation and a quality concern. The load test is not inherently performed in anchor systems and devices that utilize push-seating methods. Thus, systems, devices, and methods herein are advantageous, in part by virtue of pull-seating strand 102 (FIG. 1A) and wedge 114 within device 110, which allows for quicker assembly, easier assembly, more efficient assembly, improved quality, an a more robust assembly.

It will be appreciated that FIGS. 1A and 1B are for illustrative purposes only and that various structures, their shapes, their material makeup, and/or their sizes described above in relation to FIGS. 1A and 1B may be changed, altered, added, or removed.

Figure 2:
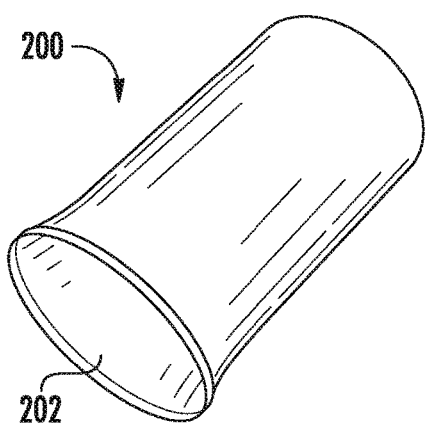
FIG. 2 illustrates an optional centering device for use in an anchor system and/or anchor device according to some aspects.

FIG. 2 is an embodiment of an exemplary, optional centering device generally designated 200 that may be used in some embodiments during overmolding of the monostrand anchor system 100. However, system 100 may be used alone, without the optional centering device 200 (e.g., see FIG. 4B).

In some embodiments, centering device 200 includes a cylindrical cup or cap having one or more interior walls 202 configured to retain a portion of strand 102. For example, one end of strand 102 (FIG. 1A) can be pulled through wedge 114 and plate 112 (FIG. 1B) and received within and/or covered by centering device 200. Portions of system 100 can be at least partially coated, layered, or covered with at least a single, protective layer or covering. In most areas or portions of an encapsulated system 100, even when a centering device 200 is used, there may still only be one layer of a covering (e.g., 404, FIGS. 4A, 4B) over portions thereof. However, there may be overlap of at least two different coverings (e.g., a sheath and a protective cover, a centering device and a protective covering, or the like) in one or more portions, in two or more portions, or in three or more portions of system 100. Thus, systems and devices herein have improved resistance to corrosion and penetration by liquids, moisture, or the like.

Figure 3A:
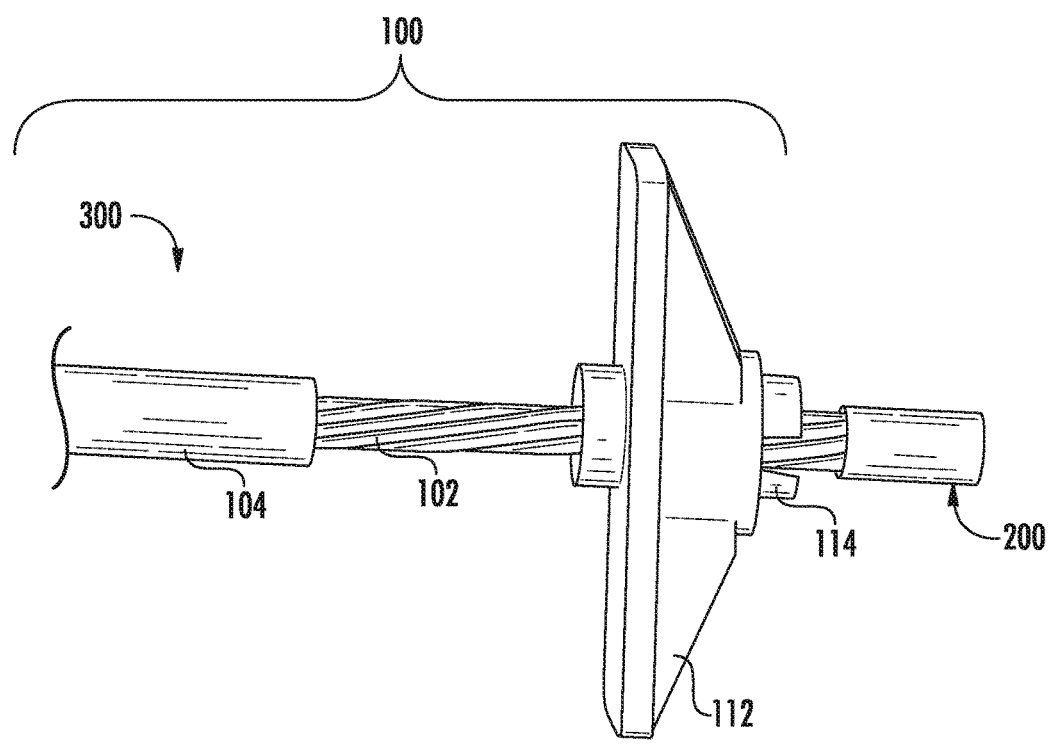
FIGS. 3A and 3B illustrate embodiments of an anchor system according to some aspects.

In some aspects, there is overlap between a protective cover and the sheathing (e.g., cover 104) on, over, and/or proximate the strand (e.g., 102) and on, over, or proximate centering device 200, where centering device 200 is used. In some aspects, centering device 200 is referred to as a first protective "cover" or a "cap" that may be molded or encapsulated within an additional protective structure, coating, layer, or material, where used.

Where used, centering device 200 may comprise an optionally white plastic material configured to affix to the free end of strand 102 as illustrated in FIG. 3A. In some embodiments, centering device 200 comprises a single, unitary piece of plastic that is filled with grease and installed over a tail (end) of strand 102 to center the anchoring system 100, or portions thereof, during a molding or encapsulation process (e.g., centered within an injection molder) that provides anchor system 100 within a plastic material. Notably, the plastic encapsulation can extend over and/or around centering device 200 and anchor components (e.g., system 100, FIG. 1A) to form a single, integrated anchor system 100 that is devoid of additional un-encapsulated parts and/or detachable and/or removable parts. Centering device 200 is a multi-purpose device as it both centers and covers a free end of strand 102 prior to and during encapsulation, thus, it provides an added layer of corrosion protection as well as centering during overmolding of an anchor system 100.

Figure 3B:
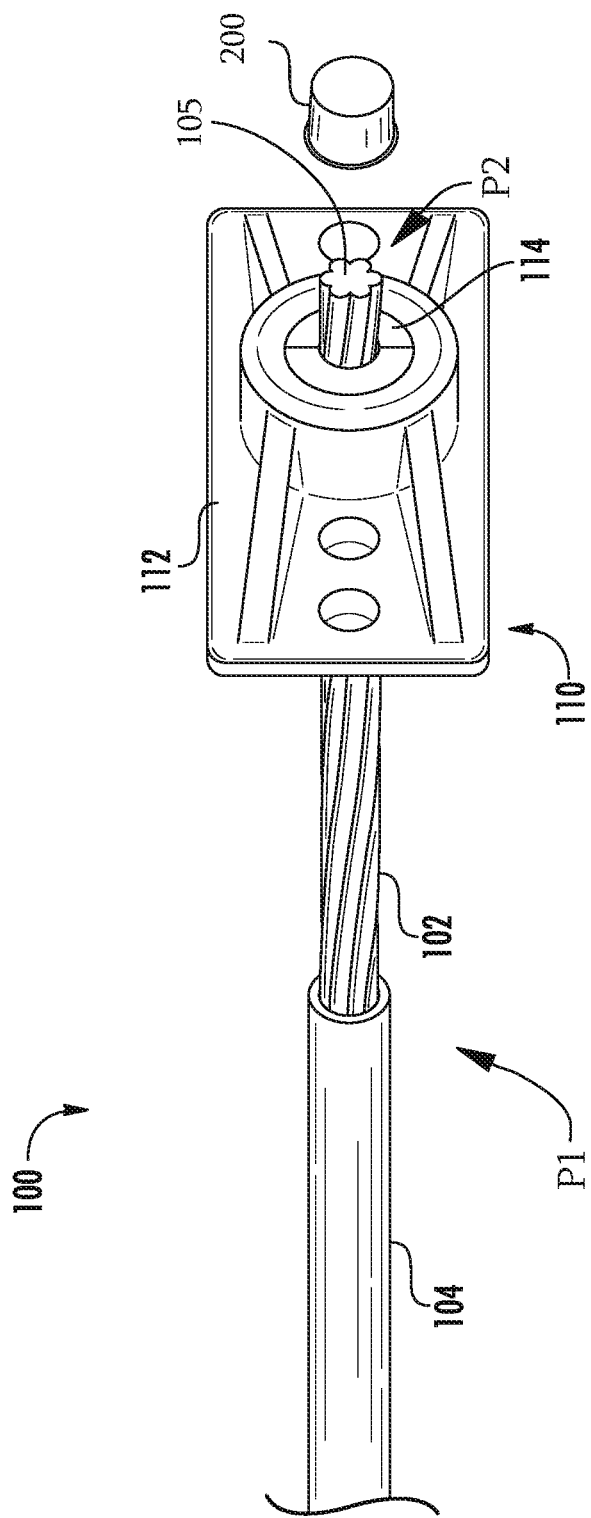

FIGS. 3A and 3B are further embodiments of an anchor system, generally designated 300. Anchor system generally designated 300 includes the optional centering device 200 affixed onto a free end (e.g., a tail) of strand 102 prior to overmolding, whereas system 100 does not include the centering device 200. Notably, centering device 200, or portions thereof, become at least partially and/or fully encapsulated in system 300, thus, the final product can include a single, uniform and fully encapsulated anchor system 300 having no removable or potentially detachable parts that are not encapsulated.

Notably, the entire system 300 may become overmolded in a protective cover, layer, member, or material (e.g., in plastic or a moldable material) to form a unitary component or system that obviates the need for installation of separate end caps over an encapsulated strand after overmolding of the strand 102. Disclosed systems and methods obviate the need for extraneous steps associated with installing grease-filled end caps after encapsulation or overmolding, thereby improving both the ease of manufacturability and the cost of providing encapsulated anchors.

FIG. 3B is an exploded view of system 300, including a strand 102 having an end 105, which may be referred to as a "tail end" or a lair. Strand 102 is disposed in, inserted through, and in some aspects, pulled-through a portion of anchor plate 112. A first portion P1 of strand 102 is disposed on one side (e.g., a first side) of anchor plate 112 and a second portion P2 of strand 102 is disposed on another side (e.g., a second, opposing side) of anchor plate 112. First portion P1 of strand 102 is at least partially disposed in and/or covered by a sheath or cover 104, and second portion P2 of strand 102 is fully devoid of the sheath or cover 104. In some aspects, second portion P2 is also the bare end 105, which is covered by centering device 200. Notably, system 300 is encapsulated in a outermost, additional protective covering (e.g., 402, FIG. 4A), such that the protective covering extends over and contacts each of the protective covering 200, strand 102, anchor plate 112, wedge 114, and cover 104, or portions thereof.

It will be appreciated that FIGS. 3A and 3B are for illustrative purposes only and that various structures, their shapes, their material makeup, and/or their sizes described above in relation to FIGS. 3A and 3B may be changed, altered, added, or removed.

FIG. 4A illustrates one embodiment of a fully encapsulated anchor system, generally designated 400A. System 400A includes an anchor system 300 (FIG. 3) having a centering device 200 disposed on and covering an end of strand 102. In some embodiments, anchor system 300 is fully disposed within an outermost protective layer, coating, material, or cover 402. In some embodiments, cover 402 can comprise a plastic encapsulant that is overmolded on, over, and/or around system 300 via an overmolding or encapsulation process.

In some embodiments, overmolding is accomplished via an injection molding process, but it is not limited thereto. Any other methodology of applying a layer or coating over system 300 may be provided. Overmolding may include any suitable coating or layering process, such as any method of disposing a protective layer or cover 402 over and around systems 100 and 300 described herein. For example and in some aspects, cover 402 may be sprayed (e.g., nozzle application), wrapped, dipped, laid-up, laminated, wound, wrapped, comprise heat-shrink, shrink-wrap, or the like.

Notably, a tail (end) of strand 102 can be fully encapsulated within and/or covered by at least one layer of material, and in some aspects, multiple layers of material, such as centering device 200 and outermost covering 402. One covering, two coverings, or more than two coverings can be provided over portions of a bare (unsheathed) strand 102.

Notably, outermost cover 402 can form an overlap region 404 that is disposed over portions of a bare (unsheathed) strand 102 and portions of the sheath or cover 104 that is disposed on or over strand 102. Overlap region 404 further improves the corrosion resistance and overall sealing of system 300, as it forms a tight seal over both the strand 102 and portions of cover 104 thereby preventing corrosive elements from reaching exposed strand 102. Fully encapsulating portions of cover 104, strand 102, anchor device 110, and covering device 200 adequately seals and protects system 300 from penetration and degradation by corrosive elements. There are also no additional or separate parts that need to be attached to system 400A after encapsulation. System 400A may be cast in concrete after encapsulation.

Once the anchor device 110 is installed or attached to strand 102, an end of the strand can optionally be covered with centering device 200. Centering device 200, where used, may improve encapsulation of the anchor (e.g., plate 112, wedges 114, and/or strand 102), but it is optional and may not be required. The anchor device 110, strand 102, and centering device 200 can be inserted into an injection molding machine and coated (e.g., encapsulated) with a protective material, such as plastic. However, any method of applying a coating to device 110 may be used (e.g., spraying, nozzle application, etc.).

In some embodiments, the anchor device 110 (e.g., plate 112 and wedges 114), strand 102, and centering device 200 are coated with a HDPE or PP plastic cover 402. The centering device 200 centers the strand 102 and anchor structure(s) during encapsulation (e.g., also referred to as molding, insert molding or overmolding). The entire anchor system 300 can be coated in plastic, including the exposed length of strand 102 for sealing the anchor plate 112, wedge 114, and the short tail of strand 102 projecting from the wedge 114 that is covered by the centering device 200. A portion of the centering device 200 may then be covered by coating 402 (e.g., injection molded plastic).

Figure 4B:
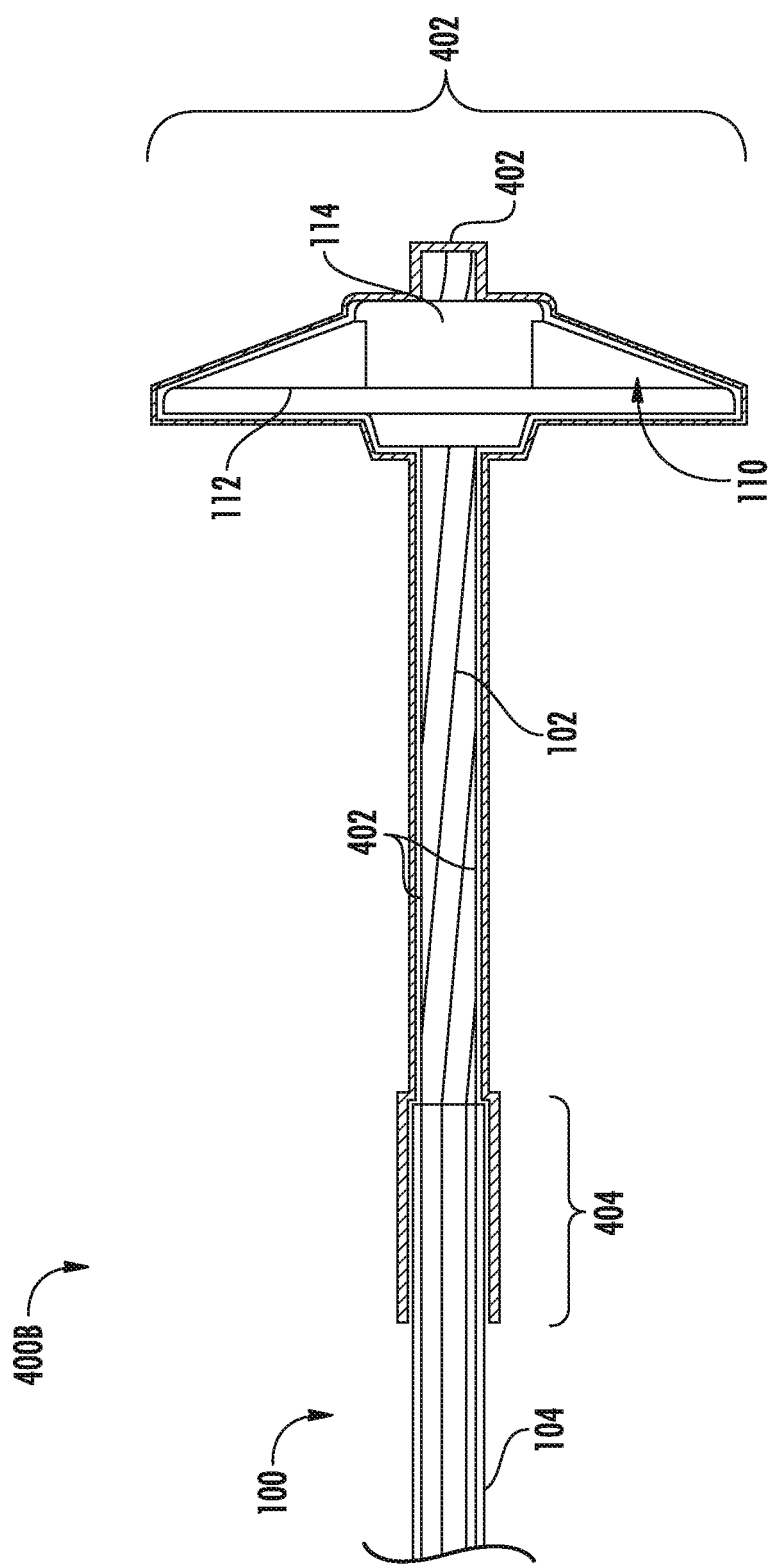

FIG. 4B is another embodiment of a fully encapsulated anchor system, generally designated 400B. System 400B includes an anchor system 100 (FIG. 1) that is devoid of a centering device (e.g., 200, FIG. 2). In some embodiments, anchor system 100 is fully disposed (e.g., fully encapsulated or covered) within at least one single, outermost protective layer or cover 402. In some embodiments, outermost cover 402 can comprise a plastic encapsulant that is overmolded on or over system 100 via an injection molding process, a spray process, a heat-shrink process, a shrink-wrap process, a dipping process, a coating process, a laying-up process, a winding process, a laminating process, or the like.

Notably, a tail (end) of strand 102 can be fully encapsulated within and/or covered by at least one single layer of material (e.g., cover 402), and in some aspects, multiple layers of material (e.g., including centering device 200 and cover 402, FIG. 4A). One covering, two coverings, or more than two coverings can be provided over systems 100 and 300 described herein. Cover 402 can coat, contact, and/or cover portions of sheath (cover 104), strand 102, and anchor system 110, which includes anchor plate 112 and wedge 114.

It will be appreciated that FIGS. 4A and 4B are for illustrative purposes only and that various structures, their shapes, their material makeup, and/or their sizes described above in relation to FIGS. 4A and 4B may be changed, altered, added, or removed.

Figure 5:
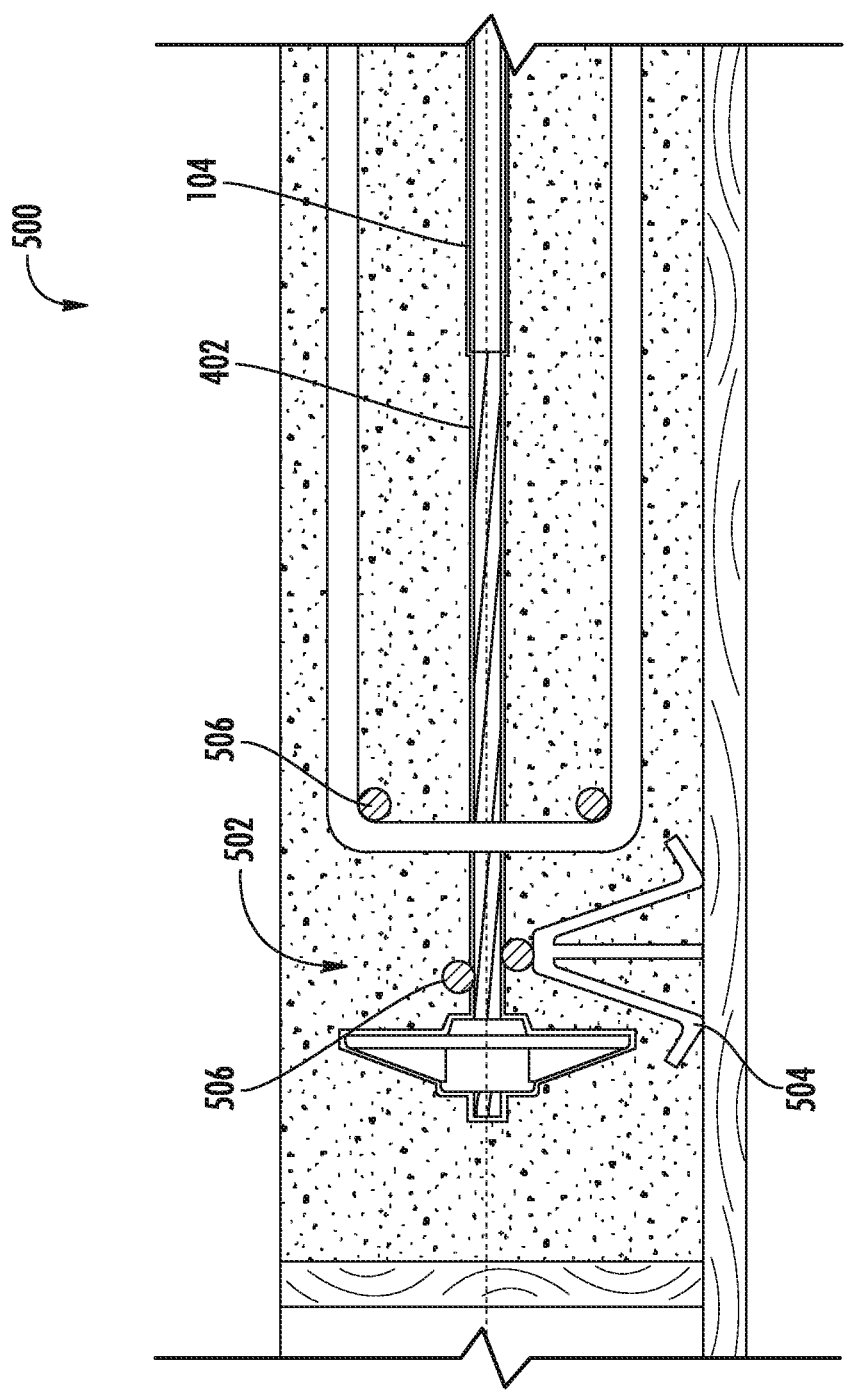
FIG. 5 illustrates an encapsulated anchor system as used in a concrete slab according to some aspects.

FIG. 5 is a further embodiment of an anchor system generally designated 500, in which a fully encapsulated anchor system (e.g., 400A, 400B, FIGS. 4A, 4B) is disposed within concrete 502. Anchor system 400A can be cast vertically or horizontally within a concrete 502 slab or beam and supported by a chair 504, bars 506, or a plurality thereof. Anchor system 400A can be supported by one or more bottom support bars, chairs, bolsters, or any other support mechanisms. In some embodiments, system 500 is configured to reinforce and/or support a structure, such as a building, a bridge, a road, or any other structure.

In some embodiments, a method of providing an anchor system is disclosed. The method provides a fully encapsulated monostrand anchor. The fully encapsulated monostrand anchor is devoid of removable parts, detachable parts, and/or secondary parts that are un-encapsulated or uncovered.

Notably, systems and methods herein are fully encapsulated after the fixed end anchor is affixed to an end of the strand 102. A method of providing a fully encapsulated anchor device and/or system includes extruding a sheath (e.g., a first cover, 104) about a strand 102. The sheath/cover 104 can comprise a 50 mil HDPE coating or covering. The sheath (e.g., a first cover, 104) is optionally plastic.

The method can further include stripping a portion of the cover 104 from strand 102. A given length (e.g., approximately 6") of the plastic extruded sheath or cover 104 can be stripped off an end of strand 102 in preparation of inserting the strand 102 in wedge 104 and the pull-seating thereof.

The method can further include pulling the strand 102 and wedge 114 into anchor plate 112. The strand 102 can be inserted through wedge 104 and pull-seated within anchor plate 112. The method can further include encapsulating the resultant structure within an additional (e.g., secondary) cover (e.g., 402) that can cover portions of the first cover 104, strand 102, and device 110 for the protection thereof. Notably, a portion of strand 102 can be provided within at least two overlapping layers of material (e.g., 104, 402) for improved durability and protection thereof. That is, devices, systems, and methods herein provide systems having overlapped portions or regions where the plastic encapsulation extends over the strand extrusion (sheath or cover 104), to maintain the encapsulation along a length of the strand.

In some embodiments, a bare (and/or optionally galvanized, epoxy, or powder coated) ductile cast iron anchor plate 112 is affixed to the end of the cable or strand 102. The extrusion that was stripped off the strand 102 allows for pull-seated anchor devices 110 (e.g., in lieu of pushing the anchors/wedges onto the strand). The wedges/anchors can also be pushed onto the strand, where desired.

Embodiments as disclosed herein can provide, for example and without limitation, one or more of the following beneficial technical effects: the ability to pull-seat the anchors (e.g., as opposed to push-seating); obviating the need for multiple, separate parts, like non-encapsulated sleeves or caps; since devices and systems are one piece, there is no risk of extraneous pieces (sleeves, caps, etc.) falling off or coming apart during transit or placement; overlap of the encapsulation on the extrusion provides an improved, tighter seal; improved processing time; improved durability; improved resistance to corrosion; and a reduced cost.

While the subject matter has been has been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. An anchor system for reinforcing a structure, the system comprising:
    an anchor plate; and
    a strand extending through the anchor plate, wherein one portion of the strand is disposed in a first cover and an end portion of the strand is bare;
    an overmolded protective cover that encapsulates the anchor plate, the end portion of the strand, and a portion of the first cover; and
    a closed end cap disposed between the end portion of the strand and the protective cover.

2. The system of claim 1, further comprising a wedge that secures the strand within the anchor plate.

3. The system of claim 1, wherein the strand comprises a plurality of metal wires.

4. The system of claim 1, wherein the anchor plate comprises iron.

5. The system of claim 1, wherein the first cover comprises plastic.

6. The system of claim 5, wherein the protective cover comprises plastic.

7. An anchor system for reinforcing a structure, the anchor system comprising:
    an anchor plate;
    a strand disposed in a portion of the anchor plate, a first portion of the strand being disposed on a first side of the anchor plate and a tail portion of the strand being disposed on a second side of the anchor plate, wherein the first portion of the strand is in a first cover and the tail portion is devoid of the first cover;
    a second protective cover disposed over the tail portion of the strand and the anchor plate for resistance to corrosion; and
    a closed end cap disposed between the tail portion of the strand and the protective cover.

8. The system of claim 7, wherein the protective cover is disposed over the first portion of the strand and the tail portion of the strand.

9. The system of claim 7, wherein the first cover comprises plastic.

10. The system of claim 7, wherein the protective cover comprises plastic.

11. The system of claim 7, further comprising a wedge that secures the strand within the anchor plate, wherein the protective cover extends over portions of the wedge.

12. The system of claim 7, wherein the strand comprises a plurality of metal wires.

13. The system of claim 7, wherein the anchor plate comprises iron.

14. A method of providing a fixed end anchor, the method comprising:
    providing an anchor plate;
    providing a strand;
    extruding a first cover over the strand;
    stripping a portion of the first cover from an end of the strand;
    pulling the strand through the anchor plate, wherein the strand is secured within the anchor plate via a wedge;
    providing a closed end cap over the stripped portion of the strand; and
    encapsulating the anchor plate, the end of the strand, the closed end cap, and portions of the first cover with an overmolded protective cover.

15. The method of claim 14, further comprising casting the fixed end anchor in concrete.

16. The method of claim 14, wherein the protective cover comprises plastic applied by injection molding, spraying, heat-shrinking, dipping, or coating.

17. The method of claim 14, wherein providing the strand comprises providing a 7 wire monostrand.

18. The method of claim 14, wherein the first cover comprises plastic.

19. The method of claim 14, wherein providing the anchor plate comprises providing an iron anchor plate.

* * * * *